United States Patent
Sasahara et al.

(10) Patent No.: US 8,504,262 B2
(45) Date of Patent: Aug. 6, 2013

(54) CONTROL APPARATUS FOR AUTOMATIC TRANSMISSION

(75) Inventors: Kazuma Sasahara, Wako (JP); Takashi Maehara, Wako (JP); Makoto Kobayashi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 303 days.

(21) Appl. No.: 12/843,849

(22) Filed: Jul. 26, 2010

(65) Prior Publication Data

US 2011/0035125 A1  Feb. 10, 2011

(30) Foreign Application Priority Data

Aug. 5, 2009  (JP) .................. 2009-182135

(51) Int. Cl.
*G06F 17/00* (2006.01)
*B60W 10/02* (2006.01)
*F16H 59/60* (2006.01)
*F16H 13/10* (2006.01)

(52) U.S. Cl.
USPC .......... 701/51; 192/3.57; 477/97; 477/45

(58) Field of Classification Search
USPC ............ 701/54, 55, 56, 61, 66, 67, 85, 86, 701/93, 95, 101, 102, 103, 104, 105, 29.1, 701/29.5, 36, 51, 65; 474/111, 169, 473.1, 474/567, 117, 821; 477/15, 111, 50, 69, 76, 477/98, 168, 174, 169, 181, 97, 45; 123/288, 123/258, 292, 321, 90.23, 90.4, 146, 336, 123/348, 47 AB, 65 V; 73/593, 660, 820, 73/114.63, 114.41–114.57, 204.19; 74/473.1, 74/567, 117, 821; 192/3.33, 3.57, 221, 225, 192/17 A
See application file for complete search history.

(56) References Cited

U.S. PATENT DOCUMENTS

| | | | |
|---|---|---|---|
| 2001/0005705 A1* | 6/2001 | Kon et al. | 477/156 |
| 2008/0096720 A1* | 4/2008 | Watanabe | 477/98 |
| 2010/0016120 A1* | 1/2010 | Dickinson et al. | 477/107 |

FOREIGN PATENT DOCUMENTS

| | | |
|---|---|---|
| JP | 07-091467 | 4/1995 |
| JP | 2001-165301 | 6/2001 |
| JP | 2003-202074 | 7/2003 |

OTHER PUBLICATIONS

Japanese Office Action for corresponding JP Application No. 2009-182135, Jun. 23, 2011.

* cited by examiner

*Primary Examiner* — Muhammad Shafi

(74) *Attorney, Agent, or Firm* — Ditthavong Mori & Steiner, P.C.

(57) ABSTRACT

A control apparatus for an automatic transmission includes a torque calculator configured to calculate a torque required during a speed change for a hydraulic clutch at a target speed stage based on an output torque of an engine. A supply fluid pressure calculator is configured to obtain, from the calculated torque, a supply fluid pressure to be supplied to the hydraulic clutch by using a clutch friction coefficient. A fluid supplier is configured to supply the obtained supply fluid pressure to the hydraulic clutch to perform the speed change for an output of the engine through a gear corresponding to the target speed stage. A clutch plate temperature estimating device is configured to estimate a plate temperature of the hydraulic clutch. A fluid pressure correcting device is configured to correct the supply fluid pressure based on the estimated plate temperature.

19 Claims, 10 Drawing Sheets

FIG. 7

HEAT QUANTITY GENERATED PER UNIT TIME
$\Delta Q = PRS2TRQ * domega * 1/100$
(HEAT QUANTITY GENERATED EVERY 10 msec)

- HEAT QUANTITY Q(t) AT TIME t $$Q(t) = \sum \Delta Q(t) \quad [J]$$

- TEMPERATURE Tp(t) AT TIME t $$Tp(t) = \frac{}{Cp \cdot m}$$

CLUTCH PLATE TEMPERATURE $$Tp(t) = \frac{}{Cp \cdot m}$$

CONTROL APPARATUS FOR AUTOMATIC TRANSMISSION

CROSS REFERENCES TO RELATED APPLICATIONS

The present application claims priority under 35 U.S.C. §119 to Japanese Patent Application No. 2009-182135, filed Aug. 5, 2009, entitled "Control Device For Automatic Transmission." The contents of this application are incorporated herein by reference in their entirety.

BACKGROUND OF THE INVENTION

1. Field of the Invention

The present invention relates to a control apparatus for an automatic transmission.

2. Description of the Related Art

Japanese Unexamined Patent Application Publication No. 2001-165301 (hereinafter, referred to as the document '301) suggests a technique provided in a control device for an automatic transmission of a parallel shaft type. The automatic transmission includes a plurality of gears and a plurality of hydraulic clutches supported by an input shaft and an output shaft arranged in parallel to one another, and changes the speed by supplying fluid pressures to the hydraulic clutches. The control device accurately calculates a friction coefficient of the hydraulic clutch and properly converts a clutch torque into a fluid pressure value.

More specifically, the technique described in the document '301 calculates a rotation difference of the hydraulic clutch, calculates a state value (Sommerfeld number), calculates a clutch friction coefficient $\mu$, and converts a clutch torque into a fluid pressure value by using the calculated clutch friction coefficient $\mu$.

In an automatic transmission, if a heat load is continuously input to a hydraulic clutch, for example, because speed change is continuously performed, the hydraulic clutch is excessively heated, and the friction coefficient of the hydraulic clutch is decreased. In the technique of related art, the plate temperature of the hydraulic clutch is not considered, and hence, the fluid pressure supplied to the hydraulic clutch may be insufficient. A similar phenomenon may occur in an automatic transmission using a planetary gear.

SUMMARY OF THE INVENTION

According to one aspect of the present invention, a control apparatus for an automatic transmission is connected with an internal combustion engine that is mounted on a vehicle and includes a plurality of gears and a plurality of hydraulic clutches. The control apparatus includes a torque calculator, a supply fluid pressure calculator, a fluid supplier, a clutch plate temperature estimating device, and a fluid pressure correcting device. The torque calculator is configured to calculate a torque required during a speed change for a hydraulic clutch at a target speed stage among the hydraulic clutches based on an output torque of the internal combustion engine. The supply fluid pressure calculator is configured to obtain, from the calculated torque, a supply fluid pressure to be supplied to the hydraulic clutch at the target speed stage by using a clutch friction coefficient. The fluid supplier is configured to supply the obtained supply fluid pressure to the hydraulic clutch at the target speed stage to perform the speed change for an output of the internal combustion engine through a gear corresponding to the target speed stage. The clutch plate temperature estimating device is configured to estimate a plate temperature of the hydraulic clutch. The fluid pressure correcting device is configured to correct the supply fluid pressure based on the estimated plate temperature.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 7 explains calculation for a plate temperature of the hydraulic clutch used in the process in FIG. 5;

DESCRIPTION OF THE EMBODIMENTS

Embodiments of the invention will be described below with reference to the attached drawings.

Figure 1:
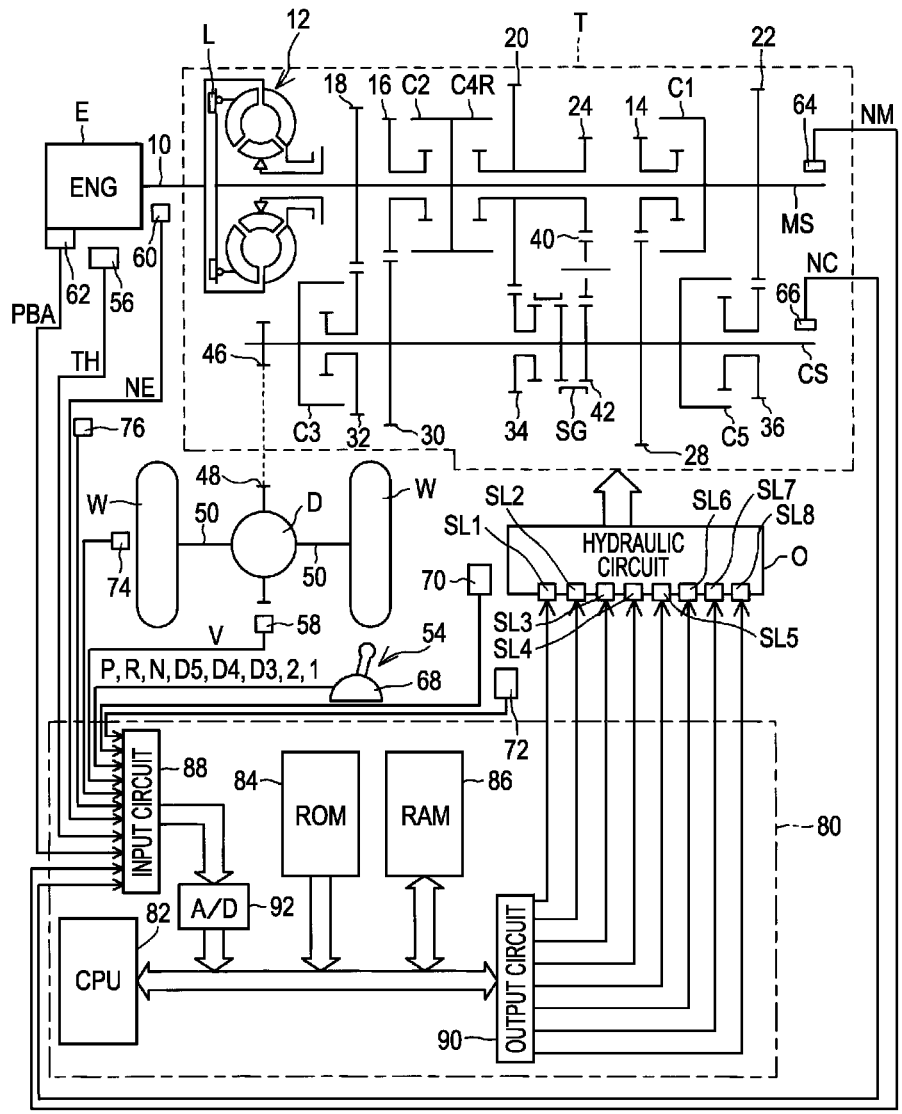
FIG. 1 schematically illustrates the overview of a control apparatus for an automatic transmission according to an embodiment of the invention.

FIG. 1 schematically illustrates the overview of a control apparatus for an automatic transmission according to an embodiment of the invention.

A reference sign T represents an automatic transmission (hereinafter, referred to as "transmission"). The transmission T is mounted on a vehicle (not shown). The transmission T is a step automatic transmission of a parallel shaft type, and has speed stages including five forward speeds and a single reverse speed.

The transmission T includes a main shaft (an input shaft) MS and a countershaft (an output shaft) CS. The main shaft MS is connected with a crankshaft 10 of an internal combustion engine (hereinafter, referred to as "engine") E through a torque converter 12 including a lockup mechanism L. The countershaft CS is connected with the main shaft MS through a plurality of gear trains.

The main shaft MS supports a main first speed gear 14, a main second speed gear 16, a main third speed gear 18, a main fourth speed gear 20, a main fifth speed gear 22, and a main reverse gear 24.

The countershaft CS supports a counter first speed gear 28 that is meshed with the main first speed gear 14, a counter second speed gear 30 that is meshed with the main second speed gear 16, a counter third speed gear 32 that is meshed with the main third speed gear 18, a counter fourth seed gear 34 that is meshed with the main fourth speed gear 20, a counter fifth speed gear 36 that is meshed with the main fifth speed gear 22, and a counter reverse gear 42 that is connected with the main reverse gear 24 through a reverse idle gear 40.

With this configuration, when the main first speed gear 14 that is relatively rotatably supported by the main shaft MS is coupled with the main shaft MS by a first speed hydraulic clutch C1, a first speed (gear, speed stage) is established.

When the main second speed gear 16 that is relatively rotatably supported by the main shaft MS is coupled with the main shaft MS by a second speed hydraulic clutch C2, a second speed (gear, speed stage) is established. When the counter third speed gear 32 that is relatively rotatably supported by the countershaft CS is coupled with the countershaft CS by a third speed hydraulic clutch C3, a third speed (gear, speed stage) is established.

In a state in which the counter fourth speed gear 34 that is relatively rotatably supported by the countershaft CS is coupled with the countershaft CS by a selector gear SG, when the main fourth speed gear 20 that is relatively rotatably supported by the mains shaft MS is coupled with the main shaft MS by a fourth-speed/reverse hydraulic clutch C4R, a fourth speed (gear, speed stage) is established.

When the counter fifth speed gear 36 that is relatively rotatably supported by the countershaft CS is coupled with the countershaft CS by a fifth speed hydraulic clutch C5, a fifth speed (gear, speed stage) is established.

In a state in which the counter reverse gear 42 that is relatively rotatably supported by the countershaft CS is coupled with the countershaft CS by the selector gear SG, when the main reverse gear 24 that is relatively rotatably supported by the mains shaft MS is coupled with the main shaft MS by the fourth-speed/reverse hydraulic clutch C4R, a reverse speed stage is established.

The rotation of the countershaft CS is transmitted to a differential D through a final driving gear 46 and a final driven gear 48. Then, the rotation is transmitted through left and right driving shafts 50 to driving wheels W of the vehicle (not shown) on which the engine E and the transmission T are mounted.

A shift lever 54 is provided near a floor of a driver seat (not shown) of the vehicle. One of eight ranges including P, R, N, D5, D4, D3, 2, and 1 can be selected by an operation of a driver.

A throttle opening sensor 56 is provided near a throttle valve (not shown) that is arranged in a suction channel (not shown) of the engine E. The throttle opening sensor 56 outputs a signal indicative of a throttle opening TH. A vehicle speed sensor 58 is provided near the final driven gear 48. The vehicle speed sensor 58 outputs a signal indicative of a vehicle speed V every one rotation of the final driven gear 48.

A crank angle sensor 60 is provided near a cam shaft (not shown). The crank angle sensor 60 outputs a CYL signal at a predetermined crank angle of a specific cylinder, outputs a TDC signal at a predetermined crank angle of each cylinder, and outputs a CRK signal at a crank angle (for example, 15 degrees) that is obtained by dividing the predetermined crank angle. An absolute internal pressure sensor 62 is provided downstream of the position of the throttle valve in the suction channel of the engine E. The absolute internal pressure sensor 62 outputs a signal indicative of a suction pipe absolute internal pressure (engine load) PBA.

A first rotation speed sensor 64 is provided near the main shaft MS. The first rotation speed sensor 64 outputs a signal every one rotation of the main shaft MS. A second rotation speed sensor 66 is provided near the countershaft CS. The second rotation speed sensor 66 outputs a signal every one rotation of the countershaft CS.

A shift lever position sensor 68 is provided near the shift lever 54 that is provided near the driver seat of the vehicle. The shift lever position sensor 68 outputs a signal indicative of a position that is selected by the driver from among the aforementioned eight positions (ranges).

A temperature sensor 70 is provided near a reservoir of the hydraulic circuit O of the transmission T. The temperature sensor 70 outputs a signal that is proportional to an automatic transmission fluid temperature TATF. A hydraulic switch 72 is provided in a common fluid channel that is connected with all clutches. The hydraulic switch 72 outputs an ON signal when the fluid pressure of this portion reaches a predetermined value.

A brake switch 74 is provided near a brake pedal (not shown) at the driver seat of the vehicle. The brake switch 74 outputs an ON signal in response to a brake pedal operation by the driver. An accelerator opening sensor 76 is provided near an accelerator pedal (not shown). The accelerator opening sensor 76 generates an output in accordance with a depressing amount (accelerator opening) AP of the accelerator pedal by the driver.

The outputs from the sensor 56 etc. are sent to an electronic control unit (ECU) 80.

The ECU 80 is formed of a microcomputer including a CPU 82, a ROM 84, a RAM 86, an input circuit 88, and an output circuit 90. The microcomputer also includes an A/D converter 92.

The outputs from the sensor 56 etc. are input to the microcomputer through the input circuit 88. An analog output is converted into a digital value through the A/D converter 92. A digital output is processed by a processing circuit (not shown) such as a wave-shaping circuit and stored in the RAM 86.

The time interval of the output from the vehicle speed sensor 58 and the time interval of the output of the CRK signal from the crank angle sensor 60 are counted by a counter (not shown), and thus, a vehicle speed V and an engine rotation speed NE are detected. The output from the first rotation speed sensor 64 and the output from the second rotation speed sensor 66 are also counted, and thus, an input shaft rotation speed NM and an output shaft rotation speed NC are detected.

The CPU 82 in the microcomputer determines a next stage or a target stage (gear ratio). The CPU 82, through the output circuit 90 and a voltage supply circuit (not shown), causes shift solenoids SL1 to SL5 arranged in the hydraulic circuit O to be excited or not excited to perform switching control of the clutches, and causes linear solenoids SL6 to SL8 arranged in the hydraulic circuit O to be excited or not excited to control an operation of a lockup mechanism L of the torque converter 12, and to control fluid pressures of the clutches.

The transmission T in this embodiment includes the plurality of gears, such as the main first speed gear 14, and the plurality of clutches Cn (n is 1, 2, 3, 4R, and 5), the gears and clutches which are supported by the main shaft (the input shaft) MS and the countershaft (the output shaft) CS that are connected with the engine (the internal combustion engine) E mounted on the vehicle and that are arranged in parallel to one another. The transmission T changes the output of the engine E by discharging a fluid pressure from a hydraulic clutch Cn at a current speed stage, and supplying a fluid pressure to a hydraulic clutch Cn at a target speed stage to cause that clutch to be coupled with the main shaft MS or the countershaft CS through a gear corresponding to the target speed stage from among the plurality of gears.

Next, the operation of the control apparatus for the automatic transmission according to this embodiment will be described.

Figure 2:
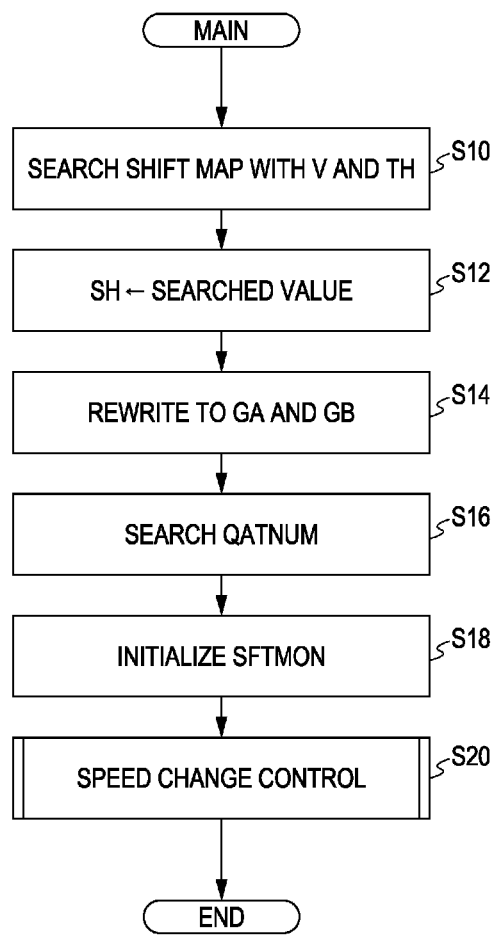
FIG. 2 is a flowchart showing an operation of the control apparatus for the automatic transmission in FIG. 1.
Figure 3:
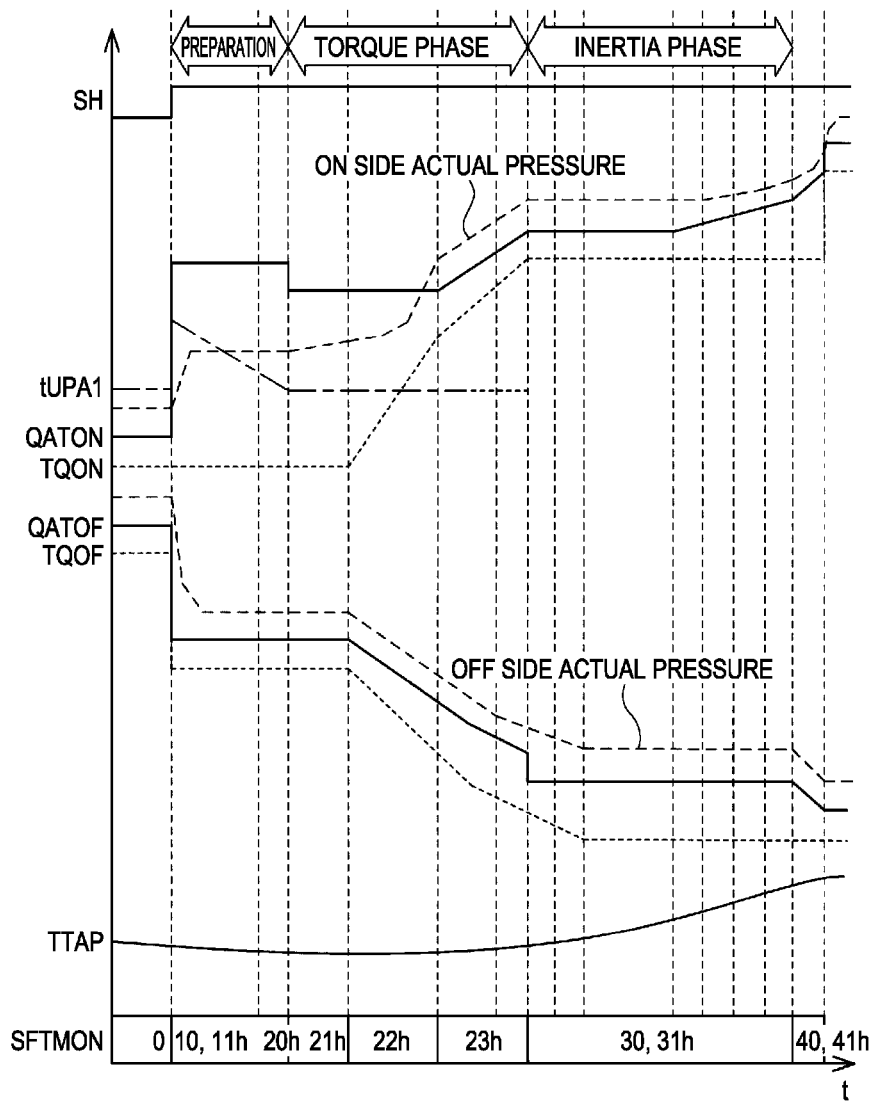
FIG. 3 is a time chart of speed change expected in FIG. 2.

FIG. 2 is a flowchart showing the operation of the control apparatus. FIG. 3 is a time chart of speed change expected in FIG. 2. A program in FIG. 2 is executed at a predetermined time, more specifically, every 10 msec.

In step S10, an existing shift map (shift scheduling map, not shown) is searched by using the detected vehicle speed V and throttle opening TH. In step S12, the searched value is rewritten to a target speed stage SH. In step S14, a currently engaged current speed stage is detected and is rewritten to GA, and SH is rewritten to GB.

In step S16, a speed change mode QATNUM is searched.

In particular, referring to FIG. 3, the speed change mode QATNUM is expressed as 11h (upshift from first speed to second speed), 12h (upshift from second speed to third speed), 21h (downshift from second speed to first speed), 31h (hold at first speed), etc. If the first number is 1, the speed change mode is upshift. If the first number is 2, the speed change mode is downshift. If the first number is 3, the speed change mode is hold.

In step S18, a value SFTMON (FIG. 3) indicative of a control timing is initialized to 0 if it is determined that the speed change is required in the process of step S10 and later.

In step S20, speed change control is executed.

Figure 4:
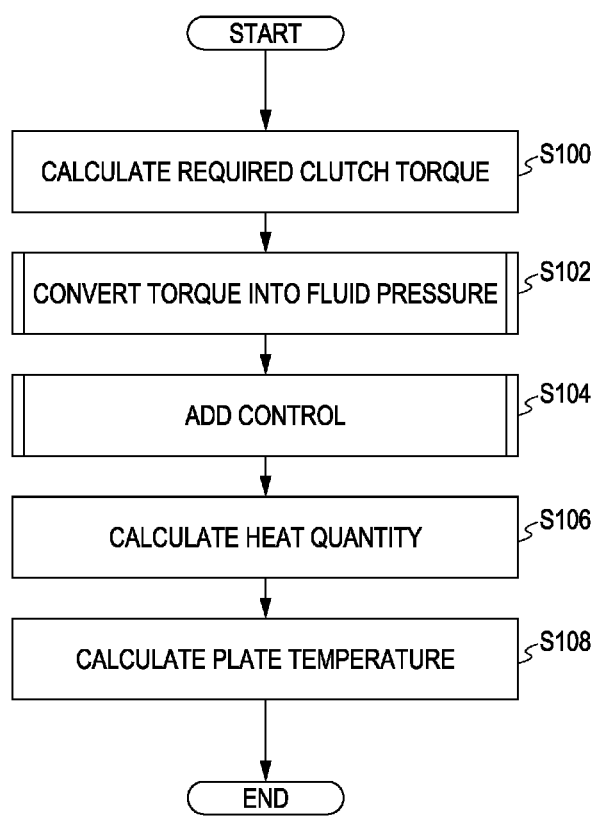
FIG. 4 is a subroutine flowchart showing a speed change control process in the flowchart in FIG. 2.

FIG. 4 is a flowchart showing the speed change control.

In step S100, a required clutch torque for the hydraulic clutch Cn at the target speed stage (GB) is calculated.

The required clutch torque is calculated by calculating a turbine torque (typically, an output torque of the engine E) input through the main shaft MS and the torque converter 12 in accordance with the engine rotation speed NE and the suction pipe absolute internal pressure PBA indicative of the engine load, and by calculating a torque required for the speed change to the target speed stage (GB) on the basis of the calculated turbine torque. The clutch torque of the hydraulic clutch Cn at the current speed stage (GA) is calculated by another routine in a preparation phase in FIG. 3.

In step S102, the calculated clutch torque is converted into a fluid pressure.

Figure 5:
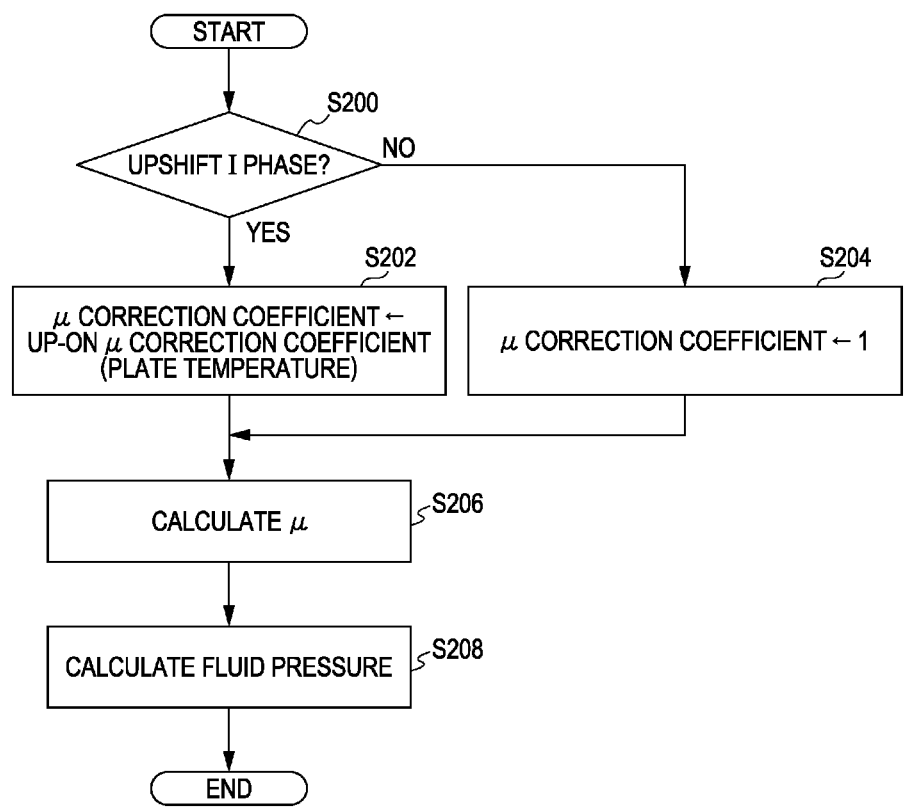
FIG. 5 is a subroutine flowchart showing a target speed stage in a torque/fluid-pressure conversion process in FIG. 4.

FIG. 5 is a subroutine flowchart showing the conversion process.

In step S200, it is determined whether the speed change mode is in an inertia phase (I phase) of upshift. In particular, it is determined whether the speed change mode is upshift and the phase thereof is the inertia phase.

Figure 6:
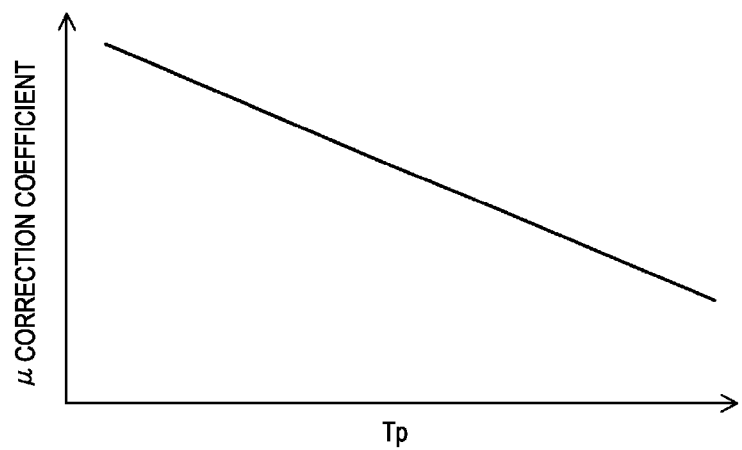
FIG. 6 is a graph explaining a characteristic of a $\mu$ correction coefficient used in the process in FIG. 5.

If YES in step S200, in step S202, a characteristic in FIG. 6 is searched from a plate temperature Tp for the hydraulic clutch Cn corresponding to the target speed stage (ON side) of the upshift, and a $\mu$ correction coefficient (correction coefficient of friction coefficient $\mu$) is calculated.

The plate temperature of the hydraulic clutch Cn for the $\mu$ correction coefficient is calculated in steps S106 and S108 in the flowchart shown in FIG. 4. However, the template temperature will be described first for the convenience of understanding.

FIG. 7 explains calculation for the plate temperature.

Referring to FIG. 7, a heat quantity $\Delta Q$ that is generated per unit time (10 msec) at the hydraulic clutch Cn is calculated by an expression as follows:

$$\Delta Q = PRS2TRQ \cdot \text{domega} \cdot (1/100).$$

In the above expression, PRS2TRQ is calculated by an expression as follows:

$$PRS2TRQ = (a+b-c) \cdot \mu \cdot KDISK,$$

where a is expressed by an expression P·Apis (P is a fluid pressure, Apis is an area of a piston of the hydraulic clutch), b is Fctn (a centrifugal force), c is Frtc (a return spring load), $\mu$ is a clutch frictional coefficient (calculated in step S206, described later), and KDISK is expressed by (ratio)·(the number of disks of the hydraulic clutch). The fluid pressure P is determined by a fluid pressure instruction value, SFTMON indicative of a control timing, etc. The ratio is a coefficient for conversion into a main shaft torque.

In the above expression, domega is calculated by an expression as follows:

$$\text{domega} = DCL \cdot 2 \cdot (\pi/60).$$

In the above expression, DCL is calculated by an expression as follows:

$$DCL = (NM - RATIOn \cdot NC),$$

where RATIOn is a ratio at an n-th speed stage. The values in the above calculations are almost fixed values or default values, and actually measured values (detected values) are only MN and NC. Although DCL is replaced with the value for the main shaft MS, DCL may be calculated as a value for each shaft at which a corresponding speed stage is provided.

In this way, $\Delta Q$ is calculated as a heat quantity per unit time $\Delta t$, and then, a temperature increase $\Delta T$ for $\Delta Q$ is calculated as follows:

$$\Delta T = \Delta Q / Cp/m,$$

where Cp is a specific heat, and m is a weight of the plate, both values being fixed values.

Then, the heat quantity Q(t) at the time t is calculated as shown in FIG. 7, and the plate temperature Tp of the hydraulic clutch Cn at the time t is calculated as shown in FIG. 7.

The plate of the hydraulic clutch Cn is cooled through heat exchange with the automatic transmission fluid ATF. Thus, a heat absorption quantity Qout of the automatic transmission fluid ATF is calculated by an expression as follows, so that the heat absorption quantity Qout is subtracted from the heat quantity Q(t) at the time t, and the plate temperature Tp is calculated by the obtained difference:

$$Q\text{out} = \beta(Tp - TATF).$$

The value of a coefficient $\beta$ is changed depending on TATF (fluid temperature) and the rotation speed (NM or NC).

In S202, the characteristic shown in FIG. 6 is searched by using the plate temperature Tp, and the $\mu$ correction coefficient is calculated. The $\mu$ correction coefficient is set to be decreased as the plate temperature Tp is increased as shown in FIG. 6.

It is to be noted that if the control is not first control although the phase is the I phase (inertia phase) of the upshift, the characteristic shown in FIG. 6 is searched by using the plate temperature Tp, and the $\mu$ correction coefficient is calculated.

If NO in step S200, in step S204, the $\mu$ correction coefficient is set to 1. Since the $\mu$ correction coefficient is a multiplication term, setting to 1 means that the correction is not performed. If NO in step S200, the phase is the torque phase, and the correction is not performed in the torque phase.

Then, in step S206, the clutch friction coefficient $\mu$ is calculated.

The calculation of the clutch friction coefficient $\mu$ is one of features of the embodiment of the invention, and therefore, the calculation of the clutch friction coefficient $\mu$ will be described below in detail.

In the technique of the document '301, the clutch friction coefficient $\mu$ of the hydraulic clutch Cn is expressed by a Sommerfeld number So calculated by using a clutch surface pressure, an automatic transmission fluid temperature (TATF), and a rotation difference of a clutch.

The Sommerfeld number So is obtained by Expression (1) as follows:

Sommerfeld number So=(viscosity coefficient of automatic transmission fluid)·(rotation difference)/(clutch surface pressure) ... (1).

In the above expression, the viscosity coefficient of the automatic transmission fluid is searched by using the automatic transmission fluid temperature TATF. The clutch surface pressure is calculated as follows:

Clutch surface pressure=(clutch torque)/2nμRm, where n is the number of clutch disks of the hydraulic clutch Cn, μ is a clutch friction coefficient, Rm is an effective radius of the hydraulic clutch Cn, all values being fixed values.

As mentioned above, if the heat load is continuously input to the hydraulic clutch Cn, for example, because the speed change is continuously performed, the hydraulic clutch Cn is excessively heated, and the friction coefficient of the hydraulic clutch Cn is decreased. In the technique of the document '301, the plate temperature Tp of the hydraulic clutch Cn is not considered, and hence, the fluid pressure supplied to the hydraulic clutch Cn may be insufficient.

To address this, in this embodiment, the Sommerfeld number calculated in step S206 by Expression (1) is multiplied by the μ correction coefficient searched by using the plate temperature Tp of the hydraulic clutch Cn through the calculation in step S202 (or S204), so as to correct the Sommerfeld number So, more particularly, the clutch friction coefficient μ.

Then, in step S208, the calculated (corrected) clutch friction coefficient μ is used, and the clutch torque is converted into a fluid pressure by an expression as follows, so as to calculate the fluid pressure as a fluid pressure value:

Pcl=(Tcl/2nμRm−Fctf+Frtn)/Apis, where Pcl is a clutch fluid pressure, and Tcl is a clutch torque. Rm is as described above.

Figure 8:
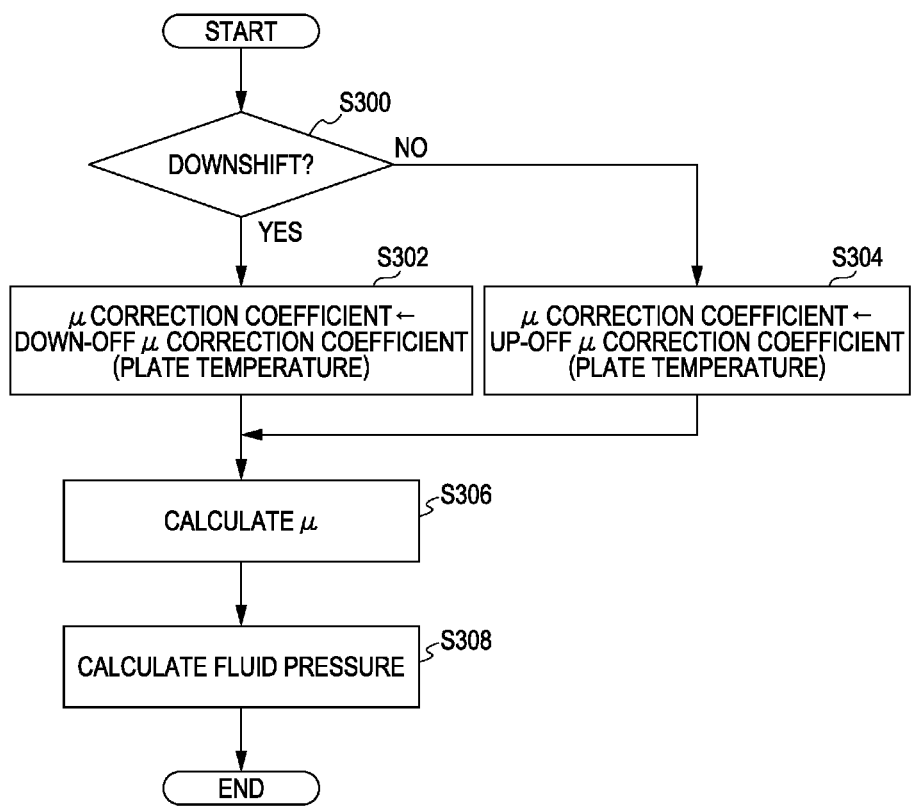
FIG. 8 is a subroutine flowchart showing a current speed stage in the torque/fluid-pressure converting process in FIG. 4.

FIG. 8 is a subroutine flowchart showing a torque/fluid-pressure conversion process at the side of the current speed stage (GA).

In step S300, it is determined whether the speed change is downshift. If YES in step S300, in step S302, a characteristic (not shown) similar to that in FIG. 6 is searched by using a plate temperature Tp for the hydraulic clutch Cn corresponding to the current speed stage (OFF side) of the downshift, and a μ correction coefficient is calculated.

If NO in step S300, in step S304, a characteristic (not shown) similar to that in FIG. 6 is searched by using a plate temperature Tp for the hydraulic clutch Cn corresponding to the current speed stage of the upshift, and a μ correction coefficient is calculated.

The plate temperature Tp used for the search in step S302 or S304 is equivalent to that described in the flowchart in FIG. 5 with reference to FIG. 7.

Then, similarly to the process in steps S206 and S208 in the flowchart in FIG. 5, in step S306, the clutch friction coefficient μ is calculated, and in step S308, the calculated (corrected) clutch friction coefficient μ is used, and the clutch torque is converted into a fluid pressure, so as to calculate the fluid pressure as a fluid pressure value to be supplied to the hydraulic clutch Cn.

Referring back to the flowchart in FIG. 4, in step S104, add control is executed.

Figure 9:
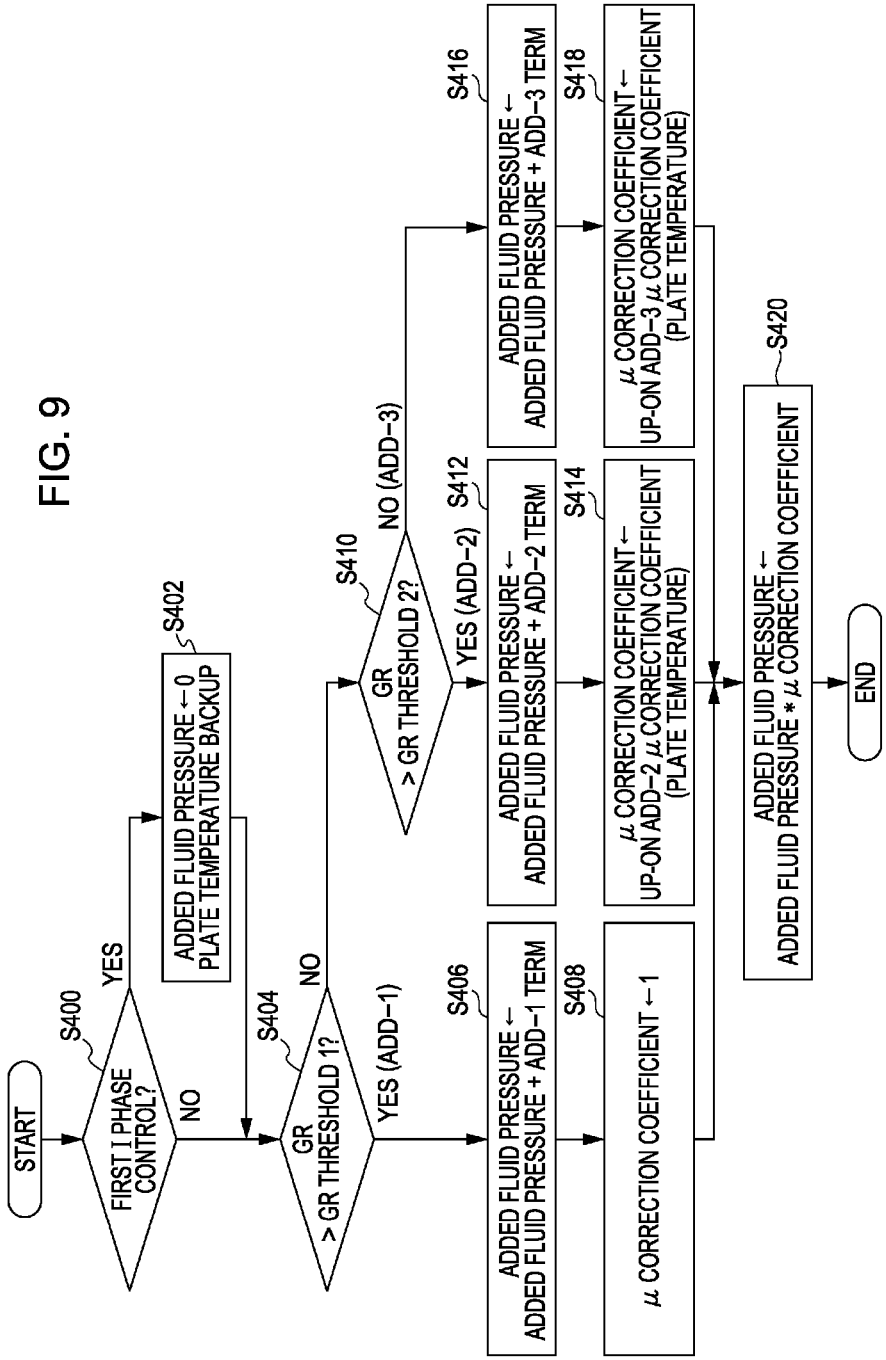
FIG. 9 is a subroutine flowchart showing an add control process in FIG. 4.

In this process, by using the calculated fluid pressure as a base fluid pressure, a fluid pressure during the speed change is added to the base fluid pressure, so as to properly control the clutch torque during the change in rotation. The control is executed in the inertia phase of each of the upshift and downshift. In FIG. 9, the case of the upshift is illustrated for example.

In step S400, it is determined whether the control is first control in the inertia phase (I phase). If YES in step S400, in step S402, an added fluid pressure (more specifically, added fluid pressure quantity, this will be applied hereinafter) is set to 0, and the plate temperature Tp is backed up (latched).

The plate temperature Tp of the hydraulic clutch Cn is continuously changed during the speed change. However, if the correction coefficient is changed accordingly, the instruction value for the supply fluid pressure may be increased and decreased, and hence may be unstable. Owing to this, the plate temperature Tp is latched to prevent such a disadvantage from occurring.

In step S404, it is determined whether GR exceeds a GR threshold 1.

Figure 10:
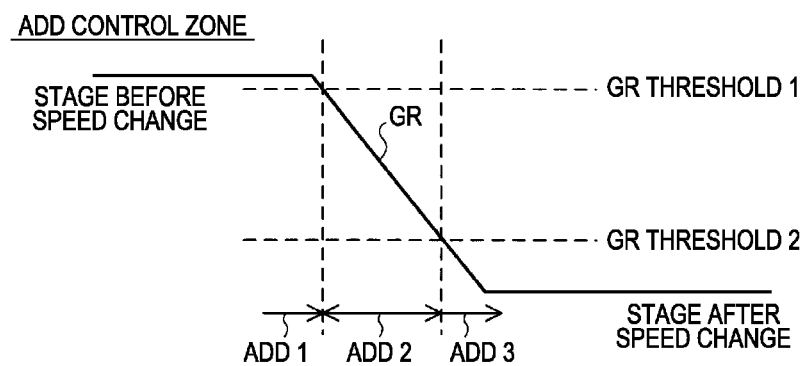
FIG. 10 explains a gear ratio used in the process in FIG. 9.

FIG. 10 explains the relationship between GR and the GR threshold 1. GR denotes a gear ratio that is obtained by (NM/NC).

If YES in step S404, the situation is at a timing indicated as "add 1" in FIG. 10. The process goes to step S406. In step S406, an add-1 term is added to the added fluid pressure, and the obtained value is set as an added fluid pressure.

Then, in step S408, the value of the added correction coefficient is set to 1. Though described later, since the correction coefficient is a multiplication term, setting to 1 means that the correction is not performed.

If NO in step S404, in step S410, it is determined whether GR exceeds a GR threshold 2.

If YES in step S410, the situation is at a timing indicated as "add 2" in FIG. 10. The process goes to step S412. In step S412, an add-2 term is added to the added fluid pressure, and the obtained value is set as an added fluid pressure.

Figure 11:
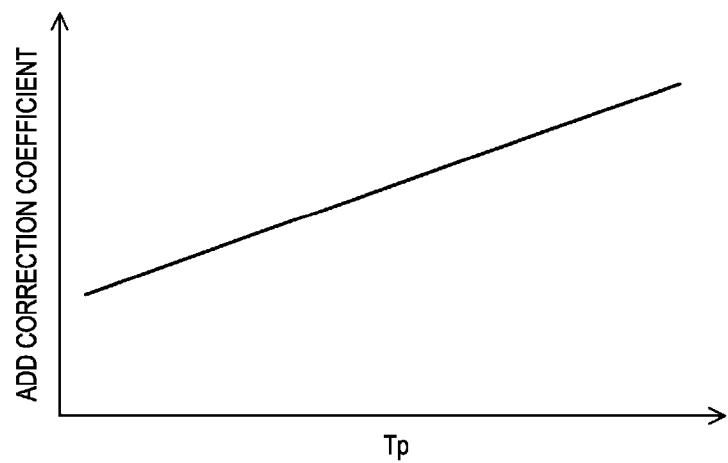
FIG. 11 is a graph explaining a characteristic of an add correction coefficient used in the process in FIG. 9.

Then, in step S414, a characteristic in FIG. 11 for the add control by 2 at the target speed stage (ON side) of the upshift is searched by using the plate temperature Tp, and an add correction coefficient is calculated. Referring to FIG. 11, the add correction coefficient is set to be increased as the plate temperature Tp is increased.

If NO in step S410, the situation is at a timing indicated as "add 3" in FIG. 10. The process goes to step S416. In step S416, an add-3 term is added to the added fluid pressure, and the obtained value is set as an added fluid pressure.

Then, in step S418, a characteristic in FIG. 11 for the add control by 3 at the target speed stage of the upshift is searched by using the plate temperature Tp, and an add correction coefficient is calculated.

In step S420, the added fluid pressure is multiplied by the add correction coefficient, and the added fluid pressure is corrected to be increased. In particular, the added fluid pressure is corrected to be increased on the basis of the plate temperature Tp of the hydraulic clutch Cn, and the supply fluid pressure is corrected, so as to prevent the supply fluid pressure from being insufficient for the hydraulic clutch Cn at the target speed stage.

Referring back to the flowchart in FIG. 4, in step S106, the heat quantity Q of the hydraulic clutch Cn is calculated, and in step S108, the plate temperature Tp is calculated.

Speed change control other than that described with reference to the flowchart in FIG. 4 is similar to that described in the document '301.

According to the embodiment, the control apparatus (the ECU 80) for the transmission (the automatic transmission) T is provided, in which the transmission T is connected with the engine (the internal combustion engine) E that is mounted on the vehicle and includes the plurality of gears (14, 16, . . . ) and the plurality of hydraulic clutches Cn (n: 1, 2, 3, 4R, 5). The control apparatus calculates the torque required for the hydraulic clutch Cn at the target speed stage (GB) during the speed change on the basis of the output torque of the engine E input to the control apparatus, obtains the supply fluid pressure to the hydraulic clutch Cn at the target speed stage (GB) by using the clutch friction coefficient μ obtained from the calculated torque, and supplies the obtained supply fluid pressure to perform the speed change for the output of the engine E through the gear corresponding to the target speed stage (GB). More specifically, the control apparatus (the ECU 80) for the transmission (the automatic transmission) T is provided, in which the transmission T is connected with the engine (the internal combustion engine) E that is mounted on the vehicle and includes the plurality of gears (14, 16, ...) and the plurality of hydraulic clutches Cn (n: 1, 2, 3, 4R, 5) supported by the main shaft (the input shaft) MS and the countershaft (the output shaft) CS arranged in parallel to one another. The control apparatus calculates the torque required for the hydraulic clutch Cn at the target speed stage (GB) during the speed change on the basis of the output torque of the engine E input to the control apparatus through the input shaft, obtains the supply fluid pressure to the hydraulic clutch Cn at the target speed stage (GB) by using the clutch friction coefficient μ obtained from the calculated torque, and supplies the obtained supply fluid pressure to perform the speed change for the output of the engine E by causing the gear corresponding to the target speed stage (GB) to be coupled with the input shaft or the output shaft. The control apparatus includes the clutch plate temperature estimating device (S106, S108) that estimates the plate temperature Tp of the hydraulic clutch Cn; and the fluid pressure correcting device (S102, S104) that corrects the supply fluid pressure on the basis of the estimated plate temperature. The control apparatus estimates the plate temperature Tp of the hydraulic clutch Cn, and corrects the supply fluid pressure on the basis of the estimated plate temperature Tp even if the heat load is continuously input to the hydraulic clutch Cn, for example, because the speed change is continuously performed. Accordingly, the control apparatus can prevent the fluid pressure supplied to the hydraulic clutch Cn at the target speed stage (GB) from being insufficient, and such shift change can match the sense of the occupant.

In particular, if the plate temperature Tp of the hydraulic clutch Cn is not recognized, in other words, if the excessively heated state of the hydraulic clutch Cn is not recognized, it is necessary to set the fluid pressure to assure an expected function even when the hydraulic clutch Cn is excessively heated during the continuous speed change. In such a case, the clutch torque when the hydraulic clutch Cn is not excessively heated may be too high, resulting in the shock due to the speed change being increased.

However, since the above configuration is provided, the (normal) clutch torque during the speed change, not in the excessively heated state, can be set to a proper value, and the decrease in the clutch friction coefficient μ in the excessively heated state can be corrected. Thus, the function in the excessively heated state can be assured. The correction for the decrease in the clutch friction coefficient μ is determined depending on the specification of the transmission T, and hence, the correction is not set at the development. The efficiency in development can be increased.

In particular, the fluid pressure correcting device may correct the supply fluid pressure by calculating the correction coefficient (the μ correction coefficient) on the basis of the estimated plate temperature Tp, and multiplying the clutch friction coefficient μ by the calculated correction coefficient to correct the clutch friction coefficient (S200 to S208, S300 to S308). In addition to the aforementioned advantages, the clutch torque, to which the change in the clutch friction coefficient μ because the hydraulic clutch Cn is excessively heated is reflected, can be supplied. The shock due to the speed change can be continuously optimum.

The fluid pressure correcting device may calculate the correction coefficient (the μ correction coefficient) to be decreased as the estimated plate temperature Tp is increased (S202, S204, S302, S304). In addition to the aforementioned advantages, the clutch torque, to which the change in the clutch friction coefficient μ because the hydraulic clutch Cn is excessively heated is further properly reflected, can be supplied. The shock due to the speed change can be continuously optimum.

The fluid pressure correcting device may correct the supply fluid pressure by calculating the correction coefficient (the add correction coefficient) on the basis of the estimated plate temperature Tp, and multiplying the added fluid pressure that is added to the supply fluid pressure by the calculated correction coefficient (S400 to S420). In addition to the aforementioned advantages, the control apparatus can further properly correct the supply fluid pressure, and further reliably prevent the fluid pressure supplied to the hydraulic clutch Cn at the target speed stage (GB) from being insufficient.

In particular, when the add control is performed for the fluid pressure, the clutch torque by the fluid pressure may vary depending on the degree of the excessively heated state of the hydraulic clutch Cn. Since the added fluid pressure is multiplied by the correction coefficient obtained on the basis of the estimated plate temperature Tp, the stable added torque can be supplied regardless of the degree of the excessively heated state of the hydraulic clutch Cn. Thus, the control apparatus can further reliably prevent the fluid pressure supplied to the hydraulic clutch Cn at the target speed stage (GB) from being insufficient.

The fluid pressure correcting device may correct the supply fluid pressure during upshift and downshift (S200 to S208, S300 to S308). In addition to the aforementioned advantages, the control apparatus can further reliably prevent the fluid pressure supplied to the hydraulic clutches Cn at the current and target speed stages (GA, GB) from being insufficient during the upshift and downshift, in which the hydraulic clutch may be likely excessively heated.

The fluid pressure correcting device may correct, during the upshift, the supply fluid pressure for the fluid pressure that is supplied to the hydraulic clutch Cn at the target speed stage (GB) and the fluid pressure that is discharged from the hydraulic clutch Cn at the current speed stage (GA) (S200 to S208, S300 to S308).

In particular, although slipping may occur because the transmission capacity of the hydraulic clutch Cn at the current speed stage (GA) is insufficient in the torque phase when the hydraulic clutch Cn at the current speed stage (GA) is at a high temperature during the upshift, the control apparatus corrects, during the upshift, the supply fluid pressure for the fluid pressure that is supplied to the hydraulic clutch Cn at the target speed stage (GB) and the fluid pressure that is discharged from the hydraulic clutch Cn at the current speed stage (GA). The slipping does not occur. In addition to the aforementioned advantages, the slipping does not occur.

When the fluid pressure correcting device corrects the supply fluid pressure for the fluid pressure that is discharged from another hydraulic clutch Cn at the current speed stage (GA), the fluid pressure correcting device may correct the supply fluid pressure by using the coefficient corresponding to the clutch friction coefficient (the μ correction coefficient). In addition to the aforementioned advantages, the supply fluid pressure can be easily corrected.

In particular, by correcting the supply fluid pressure by using the coefficient corresponding to the clutch friction coefficient μ, the correction quantity can be spontaneously determined on the basis of the basic data of the hydraulic clutch Cn. Hence, various speed change phenomena do not have to be individually set. The supply fluid pressure can be easily corrected.

The fluid pressure correcting device may correct the supply fluid pressure for the hydraulic clutch Cn at the target speed stage (GB) in the inertia phase during the upshift (S400 to S420).

In particular, although slipping may occur because the transmission capacity of the hydraulic clutch Cn at the target speed stage (GB) is insufficient in the inertia phase when the hydraulic clutch Cn at the target speed stage (GB) is at a high temperature during the upshift, the fluid pressure correcting device corrects, during the upshift, the supply fluid pressure for the hydraulic clutch Cn at the target speed stage (GB) in the inertia phase during the upshift. In addition to the aforementioned advantages, the slipping does not occur.

The fluid pressure correcting device may latch the correction coefficient in the inertia phase (S402). In addition to the aforementioned advantages, the instruction value for the supply fluid pressure can become stable.

In particular, since the plate temperature Tp of the hydraulic clutch Cn is continuously changed during the speed change, if the correction coefficient is changed accordingly, the instruction value for the supply fluid pressure may be increased and decreased, and hence be unstable. However, by latching the correction coefficient, the instruction value can be prevented from being unstable. Also, by latching the correction coefficient in the inertia phase, for example, when the inertia phase is started, a change in the plate temperature Tp occurring thereafter may be absorbed. The instruction value for the supply fluid pressure can become stable.

Since the clutch plate temperature estimating device estimates the plate temperature of the hydraulic clutch, and the fluid pressure correcting device corrects the supply fluid pressure on the basis of the estimated plate temperature, even if a heat load is continuously input to the hydraulic clutch, for example, because the speed change is continuously performed. Accordingly, the control apparatus according to the embodiment of the present invention can prevent the fluid pressure supplied to the hydraulic clutch at the target speed stage from being insufficient, and such shift change can match the sense of an occupant.

In particular, if the plate temperature of the hydraulic clutch is not recognized, in other words, if the excessively heated state of the hydraulic clutch is not recognized, it is necessary to set the fluid pressure to assure an expected function even when the hydraulic clutch is excessively heated during continuous speed change. In such a case, the clutch torque when the hydraulic clutch is not excessively heated may be too high, resulting in a shock due to the speed change being increased.

However, since the above configuration is provided, the (normal) clutch torque during the speed change, not in the excessively heated state, can be set to a proper value, and the decrease in the clutch friction coefficient in the excessively heated state can be corrected. Thus, the function in the excessively heated state can be assured. The correction for the decrease in the clutch friction coefficient is determined depending on the specification of the automatic transmission, and hence, the correction is not set at the development. The efficiency in development can be increased.

In the control apparatus for the automatic transmission according to the embodiment of the present invention, the fluid pressure correcting device may correct the supply fluid pressure by calculating a correction coefficient on the basis of the estimated plate temperature, and multiplying the clutch friction coefficient by the calculated correction coefficient to correct the clutch friction coefficient. In addition to the aforementioned advantages, the clutch torque, to which a change in the clutch friction coefficient because the hydraulic clutch is excessively heated is reflected, can be supplied. The shock due to the speed change can be continuously optimum.

In the control apparatus for the automatic transmission according to the embodiment of the present invention, the fluid pressure correcting device may calculate the correction coefficient to be decreased as the estimated plate temperature is increased. In addition to the aforementioned advantages, the clutch torque, to which a change in the clutch friction coefficient because the hydraulic clutch is excessively heated is further properly reflected, can be supplied. The shock due to the speed change can be continuously optimum.

In the control apparatus for the automatic transmission according to the embodiment of the present invention, the fluid pressure correcting device may correct the supply fluid pressure by calculating a correction coefficient on the basis of the estimated plate temperature, and multiplying an added fluid pressure that is added to the supply fluid pressure by the calculated correction coefficient. In addition to the aforementioned advantages, the control apparatus can further properly correct the supply fluid pressure, and further reliably prevent the fluid pressure supplied to the hydraulic clutch at the target speed stage from being insufficient.

In particular, when add control is performed for the fluid pressure, the clutch torque by the fluid pressure may vary depending on the degree of the excessively heated state of the hydraulic clutch. Since the added fluid pressure is multiplied by the correction coefficient obtained on the basis of the estimated plate temperature, the stable added torque can be supplied regardless of the degree of the excessively heated state of the hydraulic clutch. Thus, the control apparatus can further reliably prevent the fluid pressure supplied to the hydraulic clutch at the target speed stage from being insufficient.

In the control apparatus for the automatic transmission according to the embodiment of the present invention, the fluid pressure correcting device may correct the supply fluid pressure during upshift and downshift. In addition to the aforementioned advantages, the control apparatus according to the embodiment of the present invention can further reliably prevent the fluid pressure supplied to the hydraulic clutches at the current and target speed stages from being insufficient during the upshift and downshift, in which the hydraulic clutch may be likely excessively heated.

In the control apparatus for the automatic transmission according to the embodiment of the present invention, the fluid pressure correcting device may correct, during the upshift, the supply fluid pressure for a fluid pressure that is supplied to the hydraulic clutch at the target speed stage included in the hydraulic clutches and a fluid pressure that is discharged from another hydraulic clutch at a current speed stage included in the hydraulic clutches. In addition to the aforementioned advantages, although slipping may occur because the transmission capacity of the hydraulic clutch at the current speed stage is insufficient in the torque phase when the hydraulic clutch at the current speed stage is at a high temperature during the upshift, since the fluid pressure correcting device corrects, during the upshift, the supply fluid pressure for the fluid pressure that is supplied to the hydraulic clutch at the target speed stage and the fluid pressure that is discharged from another hydraulic clutch at the current speed stage. The slipping does not occur.

In the control apparatus for the automatic transmission according to the embodiment of the present invention, when the fluid pressure correcting device corrects the supply fluid pressure for a fluid pressure that is discharged from another hydraulic clutch at a current speed stage included in the hydraulic clutches, the fluid pressure correcting device may correct the supply fluid pressure by using a coefficient corresponding to the clutch friction coefficient. In addition to the aforementioned advantages, the supply fluid pressure can be easily corrected.

In particular, by correcting the supply fluid pressure by using the coefficient corresponding to the clutch friction coefficient, the correction quantity can be spontaneously determined on the basis of the basic data of the hydraulic clutch. Hence, various speed change phenomena do not have to be individually set. The supply fluid pressure can be easily corrected.

In the control apparatus for the automatic transmission according to the embodiment of the present invention, the fluid pressure correcting device may correct the supply fluid pressure for the hydraulic clutch at the target speed stage in an inertia phase during the upshift. In addition to the aforementioned advantages, although slipping may occur because the transmission capacity of the hydraulic clutch at the target speed stage is insufficient in the inertia phase when the hydraulic clutch at the target speed stage is at a high temperature during the upshift, the fluid pressure correcting device corrects, during the upshift, the supply fluid pressure for the hydraulic clutch at the target speed stage in the inertia phase during the upshift. Thus, the slipping does not occur.

In the control apparatus for the automatic transmission according to the embodiment of the present invention, the fluid pressure correcting device may latch a correction coefficient in the inertia phase. In addition to the aforementioned advantages, an instruction value for the supply fluid pressure can become stable.

In particular, since the plate temperature of the hydraulic clutch is continuously changed during the speed change, if the correction coefficient is changed accordingly, the instruction value for the supply fluid pressure may be increased and decreased, and hence be unstable. However, by latching the correction coefficient, the instruction value can be prevented from being unstable. Also, by latching the correction coefficient in the inertia phase, for example, when the inertia phase is started, a change in the plate temperature occurring thereafter may be absorbed. The instruction value for the supply fluid pressure can become stable.

In the above description, the automatic transmission of the parallel shaft type has been described as an example, however, the invention may be applied to a transmission of any type, for example, an automatic transmission using a planetary gear, as long as the transmission performs speed change by using a hydraulic clutch.

Obviously, numerous modifications and variations of the present invention are possible in light of the above teachings. It is therefore to be understood that within the scope of the appended claims, the invention may be practiced otherwise than as specifically described herein.

What is claimed is:

1. A control apparatus for an automatic transmission, the automatic transmission being connected with an internal combustion engine that is mounted on a vehicle and including a plurality of gears and a plurality of hydraulic clutches, the control apparatus comprising:

a torque calculator configured to calculate a torque required during a speed change for a hydraulic clutch at a target speed stage among the hydraulic clutches based on an output torque of the internal combustion engine;

a supply fluid pressure calculator configured to obtain, from the calculated torque, a supply fluid pressure to be supplied to the hydraulic clutch at the target speed stage by using a clutch friction coefficient;

a fluid supplier configured to supply the obtained supply fluid pressure to the hydraulic clutch at the target speed stage to perform the speed change for an output of the internal combustion engine through a gear corresponding to the target speed stage;

a clutch plate temperature estimating device configured to estimate a plate temperature of the hydraulic clutch; and a fluid pressure correcting device configured to correct the supply fluid pressure based on the estimated plate temperature, wherein the fluid pressure correcting device is configured to calculate a correction coefficient based on the estimated plate temperature and configured to multiply the clutch friction coefficient by the calculated correction coefficient to correct the clutch friction coefficient, to correct the supply fluid pressure, wherein the fluid pressure correcting device is configured to calculate an added fluid pressure to be added to the supply fluid pressure in accordance with a gear ratio, and wherein, when the gear ratio is equal to or smaller than a predetermined value, the fluid pressure correcting device calculates an add correction coefficient based on the estimated plate temperature and multiplies the added fluid pressure by the add correction coefficient to correct the supply fluid pressure.

2. The control apparatus for the automatic transmission according to claim 1, wherein the fluid pressure correcting device is configured to calculate the correction coefficient to be decreased as the estimated plate temperature is increased.

3. The control apparatus for the automatic transmission according to claim 2, wherein the fluid pressure correcting device is configured to multiply an added fluid pressure that is added to the supply fluid pressure by the calculated correction coefficient to correct the supply fluid pressure.

4. The control apparatus for the automatic transmission according to claim 2, wherein the fluid pressure correcting device is configured to correct the supply fluid pressure during an upshift and a downshift.

5. The control apparatus for the automatic transmission according to claim 4, wherein during the upshift, the fluid pressure correcting device corrects the supply fluid pressure with respect to a fluid pressure that is supplied to the hydraulic clutch at the target speed stage among the hydraulic clutches and with respect to a fluid pressure that is discharged from another hydraulic clutch at a current speed stage among the hydraulic clutches.

6. The control apparatus for the automatic transmission according to claim 4, wherein, when the fluid pressure correcting device corrects the supply fluid pressure with respect to a fluid pressure that is discharged from another hydraulic clutch at a current speed stage among the hydraulic clutches, the fluid pressure correcting device corrects the supply fluid pressure by using a coefficient corresponding to the clutch friction coefficient.

7. The control apparatus for the automatic transmission according to claim 4, wherein the fluid pressure correcting device corrects the supply fluid pressure for the hydraulic clutch at the target speed stage in an inertia phase during the upshift.

8. The control apparatus for the automatic transmission according to claim 7, wherein the fluid pressure correcting device latches the correction coefficient in the inertia phase.

9. The control apparatus for the automatic transmission according to claim 4,
wherein the predetermined value is a first gear threshold value.

10. The control apparatus for the automatic transmission according to claim 9,
wherein, when the gear ratio is larger than the first gear threshold value, the fluid pressure correcting device calculates the added fluid pressure not based on the estimated plate temperature, increases the added fluid pressure by a first value to achieve a first added fluid pressure, and uses the first added fluid pressure to correct the supply fluid pressure.

11. The control apparatus for the automatic transmission according to claim 10,
wherein, when the gear ratio is equal to or smaller than the first gear threshold and when the gear ratio is larger than a second gear threshold, the fluid pressure correcting device calculates the add correction coefficient based on the estimated plate temperature, increases the added fluid pressure by a second value to achieve a second added fluid pressure, and multiplies the second added fluid pressure by the add correction coefficient to correct the supply fluid pressure.

12. The control apparatus for the automatic transmission according to claim 11,
wherein, when the gear ratio is equal to or smaller than the first gear threshold and when the gear ratio is equal to or smaller than the second gear threshold, the fluid pressure correcting device calculates the add correction coefficient based on the estimated plate temperature, increases the added fluid pressure by a third value to achieve a third added fluid pressure, and multiplies the third added fluid pressure by the add correction coefficient to correct the supply fluid pressure.

13. The control apparatus for the automatic transmission according to claim 12,
wherein the third value is greater than the second value, and wherein the second value is greater than the first value.

14. The control apparatus for the automatic transmission according to claim 1, wherein the fluid pressure correcting device is configured to multiply an added fluid pressure that is added to the supply fluid pressure by the calculated correction coefficient to correct the supply fluid pressure.

15. The control apparatus for the automatic transmission according to claim 1, wherein the fluid pressure correcting device is configured to correct the supply fluid pressure during an upshift and a downshift.

16. The control apparatus for the automatic transmission according to claim 15, wherein during the upshift, the fluid pressure correcting device corrects the supply fluid pressure with respect to a fluid pressure that is supplied to the hydraulic clutch at the target speed stage among the hydraulic clutches and with respect to a fluid pressure that is discharged from another hydraulic clutch at a current speed stage among the hydraulic clutches.

17. The control apparatus for the automatic transmission according to claim 15, wherein, when the fluid pressure correcting device corrects the supply fluid pressure with respect to a fluid pressure that is discharged from another hydraulic clutch at a current speed stage among the hydraulic clutches, the fluid pressure correcting device corrects the supply fluid pressure by using a coefficient corresponding to the clutch friction coefficient.

18. The control apparatus for the automatic transmission according to claim 15, wherein the fluid pressure correcting device corrects the supply fluid pressure for the hydraulic clutch at the target speed stage in an inertia phase during the upshift.

19. The control apparatus for the automatic transmission according to claim 18, wherein the fluid pressure correcting device latches the correction coefficient in the inertia phase.

* * * * *